US012475452B2

(12) United States Patent
Traweek, III

(10) Patent No.: US 12,475,452 B2
(45) Date of Patent: Nov. 18, 2025

(54) AUTOMATED TRANSACTIONS ACROSS MULTIPLE BLOCKCHAINS WITH CRYPTOCURRENCY SWAPS

(71) Applicant: Zelus Wallet, LLC, Dallas, TX (US)

(72) Inventor: James William Traweek, III, Dallas, TX (US)

(73) Assignee: Zelus Wallet LLC, Dallas, TX (US)

( * ) Notice: Subject to any disclaimer, the term of this patent is extended or adjusted under 35 U.S.C. 154(b) by 527 days.

(21) Appl. No.: 17/580,583

(22) Filed: Jan. 20, 2022

(65) Prior Publication Data

US 2023/0109125 A1 Apr. 6, 2023

Related U.S. Application Data

(60) Provisional application No. 63/252,516, filed on Oct. 5, 2021.

(51) Int. Cl.
*G06Q 20/36* (2012.01)
*G06Q 20/06* (2012.01)
*H04L 9/32* (2006.01)

(52) U.S. Cl.
CPC ....... *G06Q 20/3678* (2013.01); *G06Q 20/065* (2013.01); *H04L 9/3236* (2013.01); *H04L 2209/56* (2013.01)

(58) Field of Classification Search
CPC ................................................ G06Q 20/3678
(Continued)

(56) References Cited

U.S. PATENT DOCUMENTS

2019/0340266 A1* 11/2019 Vo ...................... G06F 16/2365
2019/0392511 A1 12/2019 Mahajan et al.
(Continued)

FOREIGN PATENT DOCUMENTS

WO WO-2021/034603 * 6/2020 ............. G06Q 20/00
WO 2021034603 A1 2/2021

OTHER PUBLICATIONS

International Search Report and Written Opinion for PCT/US22/42588, mailed on Feb. 10, 2023, 7 pages.
(Continued)

*Primary Examiner* — John W Hayes
*Assistant Examiner* — Cristina Owen Sherr
(74) *Attorney, Agent, or Firm* — Brill Law Office; Jeffrey Brill

(57) ABSTRACT

A user operating an endpoint app chooses to obtain a blockchain-based asset on a target blockchain. The user does not have blockchain transaction credentials for the target blockchain, but does have blockchain transaction credentials for a source blockchain. The endpoint app hierarchically creates target blockchain transaction credentials for the user, using an initial seed of entropy that was used to create the user's source blockchain transaction credentials. A backend component automatically obtains an amount of target blockchain cryptocurrency sufficient to obtain the blockchain-based asset on the target blockchain, in exchange for source blockchain cryptocurrency of the user. The obtained target blockchain cryptocurrency and the hierarchically created target blockchain transaction credentials are used to automatically obtain the blockchain-based asset on the target blockchain, such that once the transaction is completed, the obtained blockchain-based asset is registered to the address of the user's hierarchically created target blockchain transaction credentials.

38 Claims, 5 Drawing Sheets

(58) Field of Classification Search
USPC .......................................................... 705/69
See application file for complete search history.

(56) References Cited

U.S. PATENT DOCUMENTS

| | | | |
|---|---|---|---|
| 2021/0056541 | A1 | 2/2021 | Kim |
| 2021/0086084 | A1 | 3/2021 | Yi et al. |
| 2021/0133700 | A1* | 5/2021 | Williams ........... G06Q 20/3829 |
| 2021/0211287 | A1* | 7/2021 | Roy ..................... H04L 9/3236 |
| 2021/0233067 | A1 | 7/2021 | Crumb et al. |
| 2022/0374886 | A1* | 11/2022 | Micali ..................... G06F 21/64 |

OTHER PUBLICATIONS

Supplementary European Search Report and Written Opinion for 22879075.4 - 1218 / 4413518 PCT/US2022042588, dated May 22, 2025, 13 pages.

"BIP 0032—Bitcoin Wiki", Anonymous, Sep. 24, 2019, 7 pages, retrieved from https://en.bitcoin.it/w/index.php?title=BIP_0032 &oldid=66756.

"BIP 0044—Bitcoin Wiki", Palatinusm Marek, et al., Nov. 12, 2020, 4 pages, retrieved from https://web.archive.org/web/20201112011726/en.bitcoin.it/wiki/BIP_0044.

"Mastering Ethereum : Building Smart Contracts and DApps", Antonopoulos, Andreas M., et al., Jan. 1, 2018, 400 pages, retrieved from URL:https://dl.ebooksworld.ir/motoman/Mastering_Ethereum_Andreas.M.Antonopoulos.www.EBooksWorld.ir.pdf.

* cited by examiner

AUTOMATED TRANSACTIONS ACROSS MULTIPLE BLOCKCHAINS WITH CRYPTOCURRENCY SWAPS

CROSS-REFERENCE TO RELATED APPLICATION

The present application claims the benefit under 35 U.S.C. § 119(e) of U.S. Provisional Patent Application Ser. No. 63/252,516, entitled "Automated Transactions Across Multiple Blockchains with Cryptocurrency Swaps," filed on Oct. 5, 2021, and having the same assignee, the entire contents of which are incorporated herein by reference.

TECHNICAL FIELD

This disclosure pertains generally to blockchains, and more specifically to automated, transparent transactions across multiple blockchains using different cryptocurrencies.

SUMMARY

A cross-blockchain transaction processing system enables users of one blockchain to execute transactions such as purchases of Non Fungible Tokens (NFTs) on other blockchains automatically, without requiring the user to create a wallet for a target blockchain, provide their blockchain address to the other party to the transaction, or purchase the digital currency of the target blockchain. For example, a user of the Ethereum blockchain could use ETH (Ethereum tokens) to purchase an NFT on the FLOW blockchain, without the user having to take care of creating a FLOW wallet, or exchanging their ETH for FLOW tokens. The cross-blockchain transaction processing system provides this automatic functionality transparently to the user. It is to be understood that Ethereum and FLOW are just examples of blockchains. Other blockchains can be used in different implementations, for example Solana, Bitcoin, or any other suitable blockchain.

In one implementation, a user operating an endpoint app of the cross-blockchain transaction processing system can choose to obtain a blockchain-based asset such as an NFT on the target blockchain, for example by making a selection on a graphical user interface of the endpoint app. The endpoint app is the part of the cross-blockchain transaction processing system that runs on the user's endpoint computer, and can be in the form of an app running on the user's mobile computing device (e.g., smart phone or tablet), or an application on the user's computer (e.g., desktop or laptop).

The user does not have blockchain transaction credentials for the target blockchain, but does have blockchain transaction credentials for the source blockchain. As discussed below, the user's source blockchain transaction credentials have been created using an initial seed of entropy. Transaction credentials for a given blockchain comprise at least a unique public/private key pair configured for transacting on the specific blockchain as well as an address, and can be in the form of a cryptocurrency wallet. It is to be understood that although the terms "address" and "public key" are often used synonymously when referring to blockchain transaction credentials, typically the address is derived from the public key but is distinct from it.

The endpoint app can hierarchically create target blockchain transaction credentials for the user, using the initial seed of entropy that was used to create the user's source blockchain transaction credentials. The creation of the target blockchain transaction credentials is transparent to the user. In one implementation, the endpoint app creates the target blockchain transaction credentials by using the user's source blockchain private key to generate both a private and a public key for the user to transact on the target blockchain. In another implementation, the endpoint app uses a private child key derivation function to derive a private key for the user to transact on the target blockchain, from the private key of the user's source blockchain transaction credentials, and uses a public child key derivation function to derive a public key for the user to transact on the target blockchain, from the public key of the user's source blockchain transaction credentials. In either case, the user's target blockchain address may be derived from the user's target blockchain public key.

The endpoint app of the cross-blockchain transaction processing system can communicate with a backend component thereof. The backend component of the cross-blockchain transaction processing system is the part of that system that runs on the backend, such as on one or more server computers remotely located from the user's endpoint computer. In one implementation, the endpoint app can transmit a corresponding control signal to the backend component over a computer network such as the internet, indicating that the endpoint app has hierarchically created the target blockchain transaction credentials for the user, as described above. The endpoint app can transmit the user's address for the target blockchain, either as part of the control signal or separately. The backend component can then automatically obtain an amount of target blockchain cryptocurrency at least sufficient to obtain the blockchain-based asset on the target blockchain, in exchange for source blockchain cryptocurrency of the user. This can be done in different ways in different implementations. In one implementation, the backend component exchanges an amount of the user's source blockchain cryptocurrency for the sufficient amount of target blockchain cryptocurrency using a pool of target blockchain cryptocurrency stored by the backend component to facilitate the exchange. In another implementation, the backend component uses an external cryptocurrency exchange service for this purpose. In any case, the cryptocurrency exchange is performed transparently to the user.

The obtained target blockchain cryptocurrency and the hierarchically created target blockchain transaction credentials are used to automatically obtain the blockchain-based asset on the target blockchain, such that once the transaction is completed, the obtained blockchain-based asset is registered to the address of the user's hierarchically created target blockchain transaction credentials. The purchase of the blockchain-based asset is transparent to the user. In one implementation, the backend component uses the obtained target blockchain cryptocurrency to purchase the blockchain-based asset on the target blockchain, using target blockchain transaction credentials of the backend component as opposed to those of the user. The backend component then transfers the blockchain-based asset to the user, such that the user's target blockchain transaction credentials are not exposed during the purchase of the blockchain-based asset.

In one implementation, the endpoint app pre-signs two transactions transparently to the user, the first transaction with the user's source blockchain private key and the second transaction with the user's target blockchain private key. The first transaction is to exchange source blockchain cryptocurrency of the user for the amount of the target blockchain cryptocurrency sufficient to obtain the blockchain-based asset on the target blockchain. The second transaction is to use target blockchain cryptocurrency to purchase the blockchain-based asset on the target blockchain. In this implementation, the endpoint app can transmit a control signal to the backend component, indicating that the endpoint app has pre-signed the transaction with the user's source blockchain private key to exchange source blockchain cryptocurrency of the user for the sufficient amount of the target blockchain cryptocurrency. The endpoint app can transmit the pre-signed transactions to the backend component, either as part of the control signal or separately. The backend component then uses the first pre-signed transaction to execute the exchange of currency. The pre-signed second transaction can then be used by the backend component to purchase the blockchain-based asset on the target blockchain using the obtained target blockchain cryptocurrency, for example by executing a smart contract on the target blockchain to obtain an NFT, transparently to the user. In some implementations, multiple copies of each transaction can be pre-signed, using separate successive nonces as described in detail below.

The features and advantages described in this summary and in the following detailed description are not all-inclusive, and particularly, many additional features and advantages may be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various implementations for purposes of illustration only. One skilled in the art will readily recognize from the following discussion that other implementations of the structures and methods illustrated herein may be employed without departing from the principles described herein.

DETAILED DESCRIPTION

A cross-blockchain transaction processing system 101 enables users of one blockchain to execute transactions such as purchases of Non Fungible Tokens (NFTs) on other blockchains automatically, without requiring the user to create a wallet for a target blockchain, provide their blockchain address to the other party to the transaction, or purchase the digital currency of the target blockchain. For example, a user of the Ethereum blockchain could use ETH (Ethereum tokens) to purchase an NFT on the FLOW blockchain, without the user having to take care of creating a FLOW wallet, or exchanging their ETH for FLOW tokens. The cross-blockchain transaction processing system 101 provides this automatic functionality transparently to the user.

Figure 1:
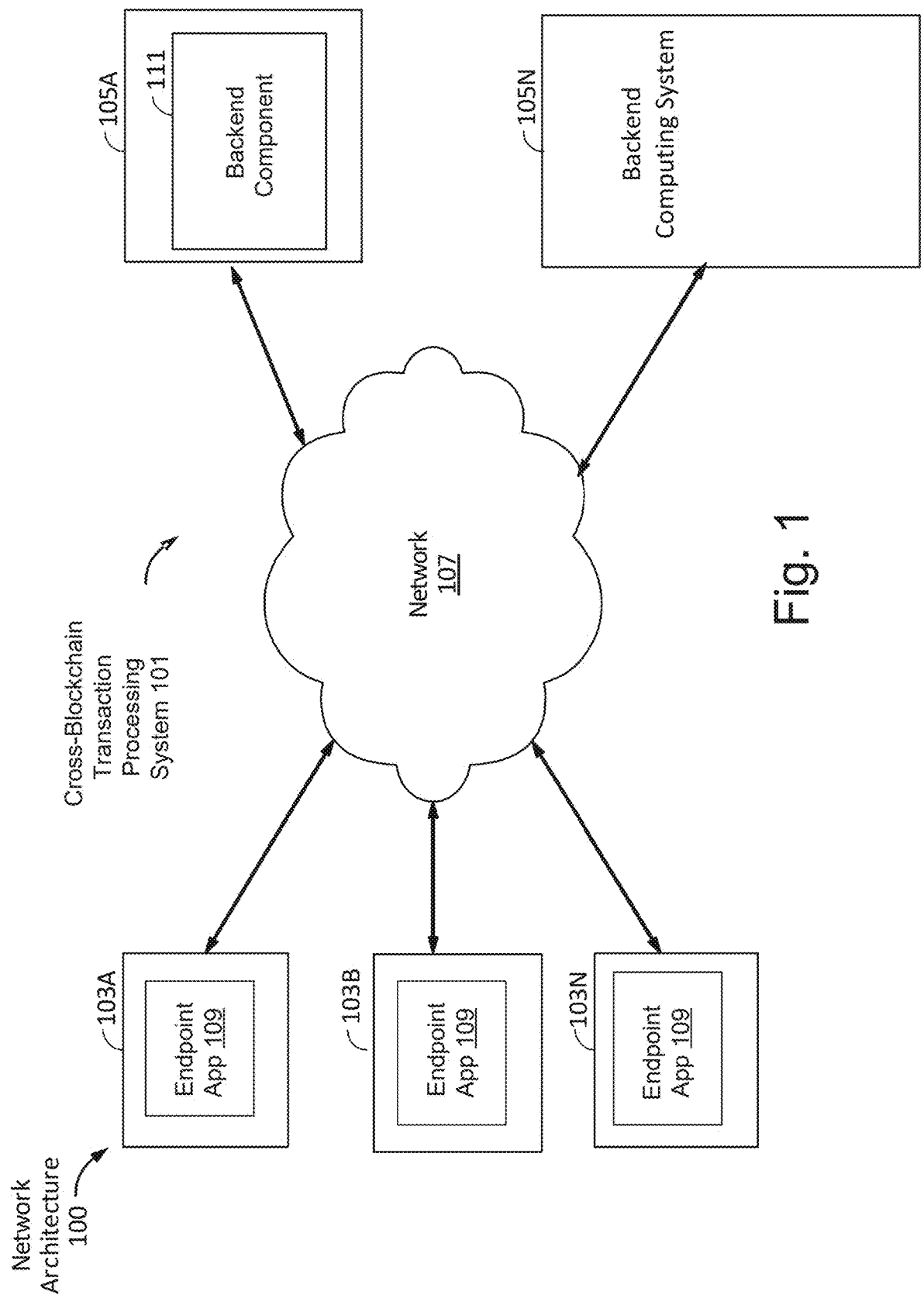
FIG. 1 illustrates a network environment in which a cross-blockchain transaction processing system can operate, according to some implementations.

FIG. 1 is a high-level block diagram illustrating an exemplary network architecture 100 in which a cross-blockchain transaction processing system 101 can be implemented. Referring to FIG. 1, the illustrated network architecture 100 comprises multiple endpoint computer system 103A, 103B, and 103N (together may be referred to as "endpoint 103") as well as multiple backend computer systems 105A, 105B, and 105N (together may be referred to as "backend 105"). In FIG. 1, a backend component 111 of the cross-blockchain transaction processing system 101 is illustrated as residing on backend computer system 105A, with an endpoint app 109 running on each endpoint computing system 103A-C. An endpoint app 109 is an endpoint level component of the cross-blockchain transaction processing system 101. It is to be understood that FIG. 1 illustrates is an example only. In various implementations, various functionalities of the cross-blockchain transaction processing system 101 can be instantiated on a backend computer system 105, an endpoint computer system 103, or can be distributed among multiple backend computer systems 105 and/or endpoint computer systems 103.

The endpoint computer systems 103 can be in the form of computing devices operated by users. A user of an endpoint computing device 103 can interact with an endpoint app 109 residing on the specific endpoint device 103 to engage in blockchain activity as discussed in greater detail below. An endpoint app 109 can communicate with the backend component 111, without the user being aware of the underlying functionality being performed transparently by the cross-blockchain transaction processing system 101.

Figure 5:
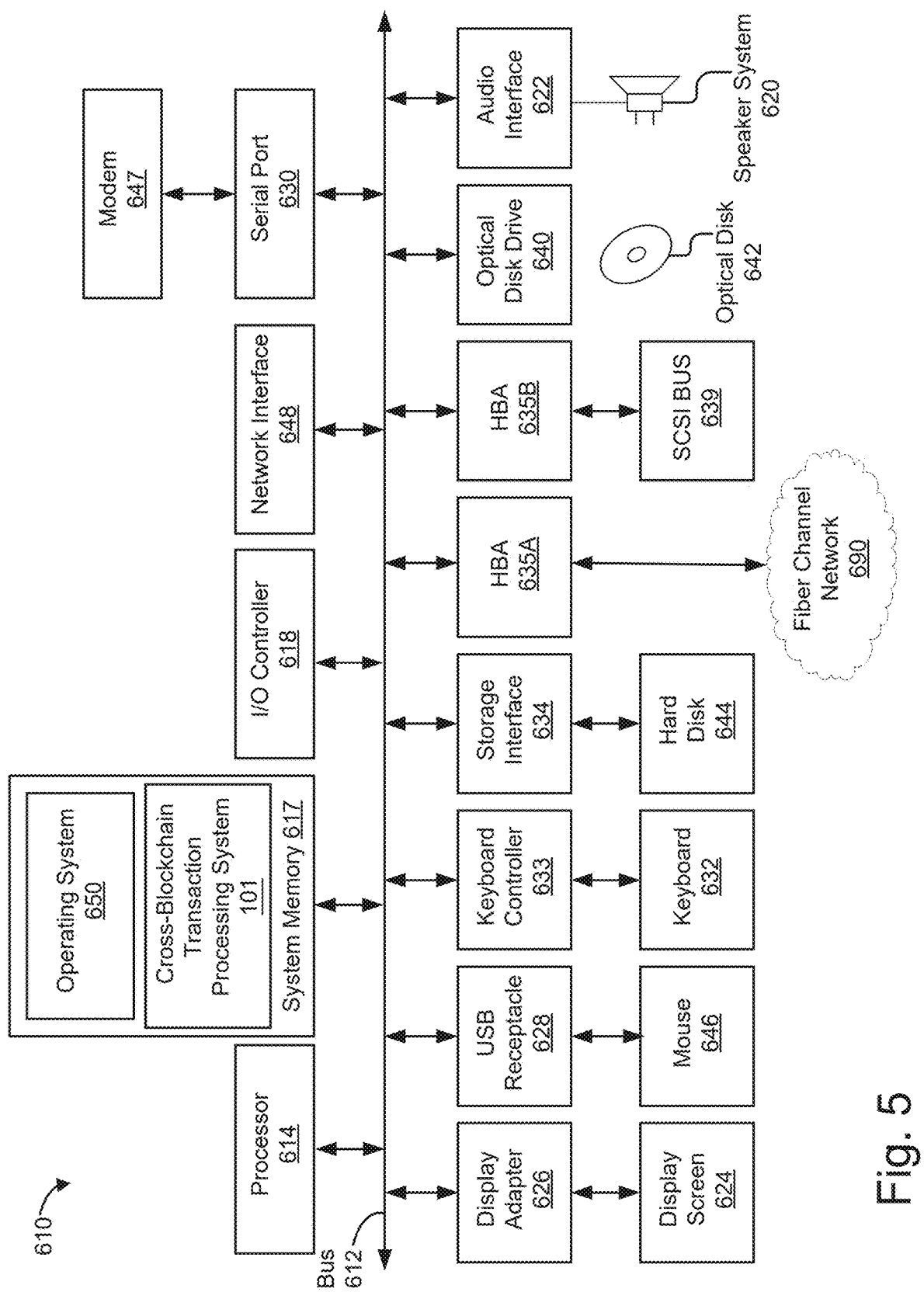
FIG. 5 illustrates a computer system suitable for implementing a cross-blockchain transaction processing system, according to some implementations.

Endpoint computer systems 103 and backend computer systems 105 can be implemented using computer systems 610 such as the one illustrated in FIG. 5 and described below. The endpoint computer systems 103 and backend computer systems 105 are communicatively coupled to a network 107, for example via a network interface 248 as described below in conjunction with FIG. 5. Endpoint computer systems 103 are able to access applications and/or data on backend computer systems 105 using, for example, a web browser or other endpoint computer system software such as an endpoint app 109. Endpoint computer systems 103 may be in the form of laptops, desktops and/or other types of computers/computing devices, including mobile computing devices, comprising portable computer systems capable of connecting to a network 107 and running applications (e.g., smartphones, tablet computers, wearable computing devices, etc.). Backend computer systems 105 can be in the form of, e.g., rack-mounted computing devices, located, e.g., in data centers.

Although FIG. 1 illustrates three endpoint computer systems 103A-C and three backend computer systems 105A-C as an example, in practice many more (or fewer) endpoint computer systems 103 and/or backend computer systems 105 can be deployed. In one implementation, the network 107 is in the form of the internet. Other networks 107 or network-based environments can be used in other implementations.

Figure 2:
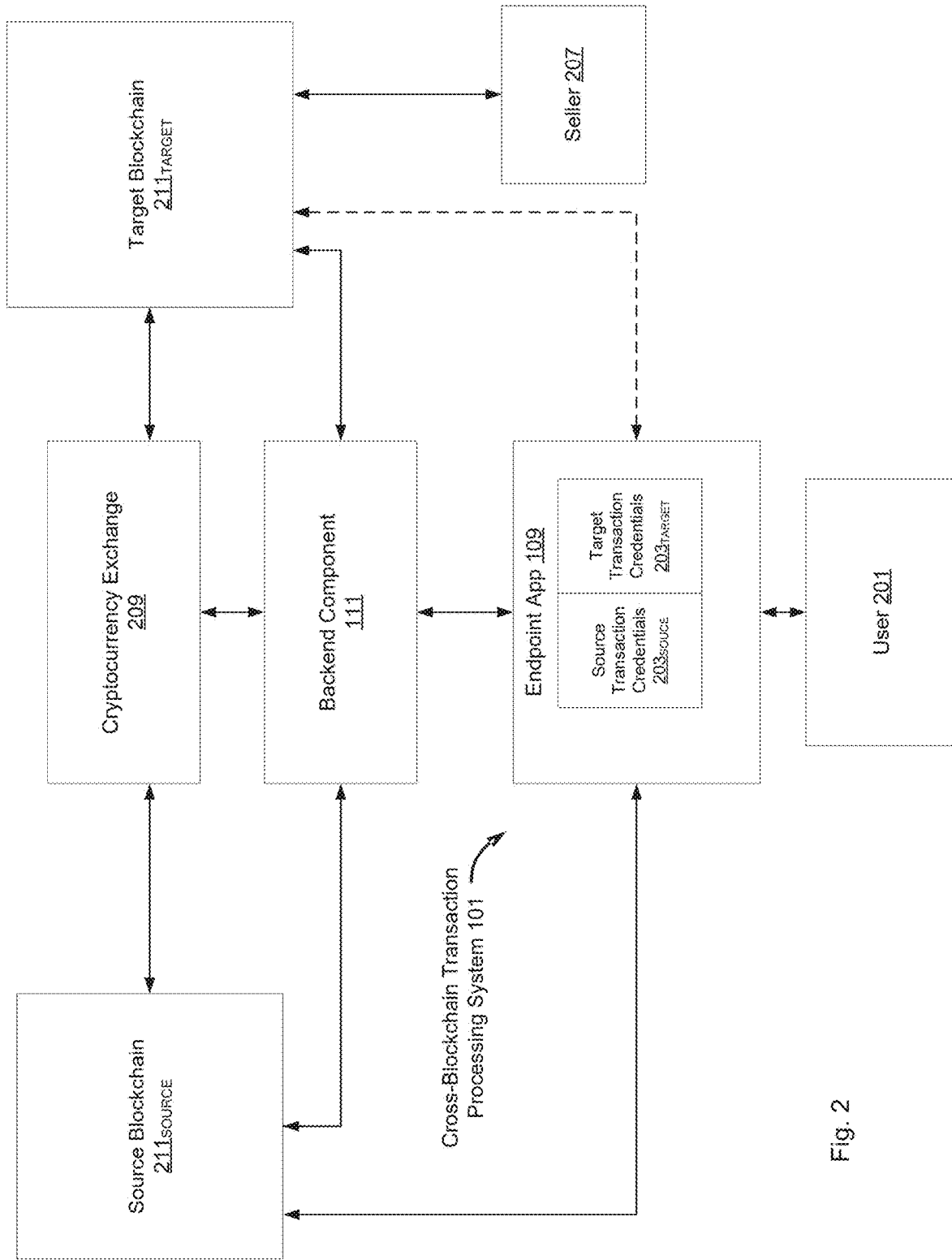
FIG. 2 illustrates the operation of a cross-blockchain transaction processing system, according to some implementations.

FIG. 2 illustrates the operation of a cross-blockchain transaction processing system 101. As described above, the functionalities of the cross-blockchain transaction processing system 101 can reside on a backend computer system 105 or other specific computer 610, or be otherwise distributed between multiple computer systems 610, including within a cloud-based computing environment in which the functionality of the cross-blockchain transaction processing system 101 is provided as a cloud-based service over a network 107. It is to be understood that although the cross-blockchain transaction processing system 101 is illustrated in FIG. 2 as comprising a backend component 111 and an endpoint app 109, each of which is illustrated as a single entity, the cross-blockchain transaction processing system 101 represents a collection of functionalities, which can be instantiated as a single or as multiple modules, as desired. In some implementations, the different modules of the cross-blockchain transaction processing system 101 can reside on different computing devices 610 as desired. The backend component 111 can be implemented as one or more applications configured to run on the backend computer system 105. Each endpoint app 109 can be instantiated as an application configured to run under an operating system such as Windows, OS X, Linux, etc., or as an app for a given mobile operating system (e.g., Android, iOS, Windows 11, etc.), with different endpoint apps 109 being specifically implemented for different types of operating environments utilized by different end users.

It is to be understood that the components and modules of the cross-blockchain transaction processing system 101 can be instantiated (for example as object code or executable images) within the system memory 617 (e.g., RAM, ROM, flash memory) of any computer system 610, such that when the processor 614 of the computer system 610 processes a module, the computer system 610 executes the associated functionality. As used herein, the terms "computer system," "computer," "backend computer system," "endpoint computer system," "client," "client computer," "server," "server computer" and "computing device" mean one or more computers configured and/or programmed to execute the described functionality. Additionally, program code to implement the functionalities of the cross-blockchain transaction processing system 101 can be stored on computer-readable storage media. Any form of tangible computer-readable storage medium can be used in this context, such as magnetic, optical, flash and/or solid-state storage media, or any other type of media. As used herein, the term "computer-readable storage medium" does not mean an electrical signal separate from an underlying physical medium.

As illustrated in FIG. 2, the cross-blockchain transaction processing system 101 automatically executes transactions across a source blockchain $211_{SOURCE}$ and a separate target blockchain $211_{TARGET}$. The backend component 111 of the cross-blockchain transaction processing system 101 can reside on a backend computer system 105, and an endpoint app 109 can reside on an endpoint computing system 103. A specific user 201 can interact with the endpoint app 109 on, e.g., the endpoint computing system 103 in order to engage in blockchain transactions as described herein.

Users who engage in blockchain based transactions are often users of a specific blockchain, and have blockchain transaction credentials 203 and cryptocurrency specific to that blockchain. Blockchain transaction credentials 203 comprise at least a unique public/private key pair configured for transacting on a specific blockchain. Blockchain transaction credentials 203 can be in the form of a cryptocurrency wallet for a specific blockchain. It is to be understood that a cryptocurrency wallet is a software program, device or physical medium which stores a public/private key pair used for cryptocurrency transactions. In addition to storing the keys, a cryptocurrency wallet may offer additional functionality such as encrypting and/or signing transactions such as smart contracts using the private key. Various technologies can be used to store the values of the public and private keys, or a seed value for generating the keys, such as a software wallet running on a computer, a wallet hosted on an exchange where cryptocurrency is traded, wallet information on a digital medium, a dedicated hardware wallet, etc. In some implementations, a user's endpoint app 109 implements and manages wallet functionality for that user.

The user 201 of the endpoint app 109 illustrated in FIG. 2 can engage in blockchain based transactions by interacting with the interface of the endpoint app 109. It is to be understood that a blockchain is a growing list of data records, known as blocks, which are linked together using cryptography. Each block contains a cryptographic hash of the previous block, and may contain a timestamp and transaction data. The timestamp proves that the transaction data existed when the block was added to the blockchain. As blocks in the chain each contain a cryptographic hash of the previous block, a blockchain is resistant to modification, because no block can be modified after it is added to the chain without altering all subsequent blocks. The nature of this cryptographic linking of the blocks provides a high level of security, especially if there are a large number of blocks.

A blockchain is distributed across a peer-to-peer network. Blockchains are managed by their corresponding peer-to-peer network, where nodes on the network collectively adhere to a given protocol to communicate and validate new blocks. A consensus algorithm is used that allows the participating nodes to agree on information included within each new block. Using the consensus algorithm, the blockchain is replicated and maintains the same state across the network of participants, allowing the blockchain to function as a secure, decentralized, append-only ledger. Examples of consensus algorithms that can be used in this capacity include proof-of-work, proof-of-stake, proof-of-activity, proof-of-burn, proof-of-capacity, or proof-of-elapsed time. Different blockchains utilize different formats, protocols, networks, etc. Some examples of blockchains include, Bitcoin, Ethereum, FLOW, Tezos, etc.

A blockchain can be used as a ledger for transactions using a specific corresponding digital currency, with the blocks documenting one or more transactions that involve the transfer of the corresponding currency from one party to another. In some implementations, the currency is created as a reward for a process called mining, which is successful use of the consensus protocol to solve a computational problem and thereby validate a new block that is added to the chain. This is known as a proof of work consensus protocol. In other implementations, different proof of consensus protocols are used, such as proof of stake in which nodes compete to append blocks and earn associated rewards in proportion to stake, or existing cryptocurrency allocated and locked or staked for some time period. Other consensus protocols include proof of authority, proof of space, proof of burn, or proof of elapsed time. Different consensus protocols may be used in conjunction with different implementations of the cross-blockchain transaction processing system 101 as desired.

Digital currency is registered to a specific address (typically derived from a public key). Once created and awarded to a miner (or other party as appropriate in implementations using different consensus protocols), the currency can be transferred to another party, using the public key of the receiving party as an address and the private key of the transferring party to sign the transaction. Owners of units of digital currency can subsequently use it in further transactions. Each transaction is broadcast to the peer-to-peer network, and once validated it is added to a new block in the chain, created through the process of mining (or other method) using the consensus protocol. To prevent double spending, each transfer must refer to a previous unspent receipt of the currency in the blockchain.

One type of blockchain transaction is the purchase of a non-fungible token (NFT) using cryptocurrency. An NFT is a unit of data stored on a blockchain that certifies the unit of data to be unique and, therefore, not interchangeable. An NFT can be associated with a particular digital or physical asset (such as a file or a physical object), and a license to use the asset for a specified purpose. An NFT does not contain the underlying digital asset itself, but rather contains data that ties it to the asset. This data may be called the metadata. An example of metadata for an NFT would be a URL of the digital image to which the NFT grants rights. NFTs can be traded and sold on digital markets as blockchain transactions. Being a unit of data on a blockchain, an NFT may be sold and traded Unlike cryptocurrencies, NFTs are not mutually interchangeable, hence are not fungible. While all bitcoins or ETH are equal, each NFT is unique, represents a different underlying asset, and thus may have a completely different value from other NFTs.

When an NFT is created and added to a blockchain record, the process may be referred to as minting the NFT. A smart contract may be in the form of a computer program or transaction protocol which may automatically execute, control or document legally relevant events and actions according to the terms of a contract or an agreement. A smart contract (the "mint") may be created and placed on the blockchain. This contract may define the token type, structure, and in some cases code and data, and individuals can use the smart contract's functions to purchase the NFT (or multiple NFTs) defined by the contract, to transact them with other parties, and so forth. Different blockchains use different standards and formats for representing NFTs and smart contracts. For example, a smart contract may be in the form of a program which is stored on and executed by the blockchain. The NFT smart contract may define the token type, structure, and data/metadata of the NFT collection. The smart contract may be deployed to (stored on) the blockchain, and then users interact with the smart contract over the blockchain to use a mint function contained by the contract to create a new instance of an NFT in the collection defined by the contract. This mint function may be restricted so that only the creator of the smart contract can invoke it (thus creating a new NFT in the collection), or it may be unrestricted in which case any party may invoke this function.

When an NFT is minted on a specific blockchain, e.g., Ethereum, conventionally the only way to purchase the NFT is with ETH (Ethereum) tokens. This is because the smart contract is hosted on the Ethereum blockchain, and so the smart contract is only capable of transacting in ETH tokens. When a user wishes to purchase an NFT minted on Ethereum, conventionally they need to pay for it in Ethereum. If they own Ethereum, this process is straightforward: they invoke the functions on the contract that handle NFT purchases and transactions, and they pay two fees: 1) they pay a transaction fee, called a gas fee, to the Ethereum node that is executing the transaction; and 2) they pay the cost of the purchase price of the NFT to the smart contract's account.

Suppose the user 201 only has transaction credentials 203 for the source blockchain 211 (for example, an Ethereum wallet, but wishes to purchase a specific target blockchain-based asset (a specific NFT for example) that is on a different blockchain, for example FLOW. As noted above, Ethereum and FLOW are not compatible, and ETH may not be used to purchase an NFT on the FLOW blockchain. However, the functionality provided by the endpoint app 109 and the backend component 111 of the cross-blockchain transaction processing system 101 enable the execution of transactions across the two incompatible blockchains. More specifically, the user 201 can initiate a purchase of the FLOW NFT via the endpoint app 109 (for example by selecting a BUY button or other GUI component on the user interface of the endpoint app 109). As described in detail below, this can initiate a series of communications between the endpoint app 109 and the backend component 111, and corresponding actions by one or both of these components that execute the transaction transparently to the user 201.

In the example scenario being discussed in conjunction with FIG. 2, the user 201 has transaction credentials $203_{SOURCE}$ for the source blockchain $211_{SOURCE}$ (Ethereum in this example), but the user does not have blockchain transaction credentials $203_{TARGET}$ for the target blockchain $211_{TARGET}$ (FLOW in this example). It is to be understood that Ethereum and FLOW are just examples of blockchains, and source and target blockchains can be of other blockchain types in other scenarios and implementations (e.g., FLOW, Ethereum, Solana, Bitcoin, etc.).

In response to the user 201 selecting a specific blockchain-based asset on the target blockchain $211_{TARGET}$ to purchase via the interface of the endpoint app 109, in one implementation the endpoint app 109 transmits a control signal to the backend component 111 indicating to obtain the blockchain-based asset on the target blockchain $211_{TARGET}$. This is done transparently to the user. In this implementation, this control signal is transmitted to and thus received by the backend component 111 executing on the backend computer system 105. It is to be understood that in this context control signals can be in the form of electronic network-based communication between the endpoint app 109 and the backend point 111 using any suitable network or inter-process communication protocol.

The endpoint app 109 can examine the transaction credentials that the user 201 has, and determine that, in this example, the user only has an Ethereum wallet. The endpoint app 109 then hierarchically creates target blockchain transaction credentials $203_{TARGET}$ for the user (e.g., a FLOW wallet), using the initial seed of entropy that was used to create the user's source blockchain transaction credentials, transparently to the user, as described in more detail below. To clarify the role of the initial seed of entropy, in the creation of the additional transaction credentials 203 (e.g., the FLOW wallet) for the user, Hierarchical Deterministic Wallets are now discussed.

Hierarchical Deterministic Wallets is a standard that defines the process for the creation of multiple cryptocurrency wallets from a single seed value. As noted above, each cryptocurrency wallet includes an asymmetric keypair consisting of a public key and a private key. The underlying cryptographic standard that specifies the key formats and encryption and decryption schemes for Ethereum and many other blockchains is SECP256k1, although different cryptographic standards may be used in different blockchains. Because of the nature of asymmetric key cryptography, the public key does not need to be kept secret. For cryptocurrency wallets, the public key functions as the user's wallet address, and is used to send transactions to the user's wallet. The private key is kept secret and should be known only to the wallet owner. This key is used to cryptographically sign transactions on the blockchain, authenticating that the transaction was in fact performed by the claimed wallet owner. Together, the public and private keys that are included in a cryptocurrency wallet allow a user to transact on the blockchain.

In some implementations, the public/private keypair of a cryptocurrency wallet can be generated from a seed. This seed is a high-entropy sequence of, e.g., 128 bits, that is generated by a cryptographically secure random number generator. Once an initial wallet keypair is generated from this seed, additional cryptocurrency wallets can be generated from these keys, for example by using the BIP-32 specification, which is a standard that defines a process for the creation of a large number of cryptocurrency wallets from a single seed. Further wallets may be derived from existing wallets in a hierarchical manner. This hierarchical wallet generation process is also deterministic. In other words, given the same initial entropy seed and no other information about any of the wallets or their keys, it is possible to recreate (i.e., recover) every single wallet in the hierarchy.

Since the initial seed of entropy that is used to create a wallet is, in the example of BIP-32, 128 raw bits, it is not easy to remember, to store, or to communicate. The BIP-39 specification defines a standard for encoding the information contained in such a seed into a 12-word phrase known as a mnemonic. An example of one such mnemonic could be "witch collapse practice feed shame open despair creek road again ice least."

The specification for BIP-32 highlights the process of creating keypairs for Bitcoin-specific wallets. However, the BIP-44 specification extends BIP-32 by allowing for cryptocurrency types to be added to the hierarchy so that the same initial entropy (represented by a BIP-39 mnemonic) may be used to create a wallet that can be used for multiple wallets for each coin type. The endpoint app 109 can store the piece of entropy used to create the initial wallet on the user's device, and can use it to create additional accounts for the user without having to generate a new seed and use it to create a new wallet. The same mnemonic can then be used to recover all of those wallets in the hierarchy by using the piece of entropy that it encodes to recreate the keys of those wallets.

Returning to the description of obtaining the asset for the user 201 in conjunction with FIG. 2, the user has source blockchain transaction credentials $203_{SOURCE}$ (an Ethereum wallet in this example scenario) that have been created using an initial seed of entropy. In response to determining that the user lacks blockchain transaction credentials $203_{TARGET}$, the endpoint app 109 running on the endpoint computer system 103 hierarchically creates target blockchain transaction credentials $203_{TARGET}$ (a FLOW wallet in this example) for the user 201, using the same initial seed of entropy that was used to create the user's source blockchain transaction credentials $203_{SOURCE}$. It is to be understood that the target blockchain transaction credentials $203_{TARGET}$ are created transparently to the user 201. In other words, the endpoint app 109 does not require any input from or interaction with the user 201 to create the user's target blockchain transaction credentials $203_{TARGET}$. Nor does the user need to request creation of the target blockchain transaction credentials $203_{TARGET}$ or be involved with or even aware of the creation thereof. Instead, in response to the user 201 initiating the purchase of the target blockchain based-asset (the NFT in this example) on the target blockchain $211_{TARGET}$ for which the user 201 does not have transaction credentials $203_{TARGET}$, the cross-blockchain transaction processing system 101 creates target blockchain transaction credentials $203_{TARGET}$ for the user 201 automatically.

The hierarchical creation of the target blockchain transaction credentials $203_{TARGET}$ (the FLOW wallet in this example) for the user is now described in greater detail. The endpoint app 109 generates the FLOW wallet using the same entropy that generated the Ethereum wallet, using the derivation process described above. More specifically, the endpoint app 109 generates a FLOW wallet for the user 201 by using the private key from his or her ETH wallet. First, the private FLOW key is generated from the user's private ETH key, for example by using the following private parent key to private child key derivation function. Given a parent key and an index i, it is possible to compute the corresponding child key. The algorithm to do so depends on whether the child is a hardened key or not (or, equivalently, whether $i \geq 2^{31}$). The function CKDpriv (($k_{PAR}$, $c_{PAR}$), i)→($k_i$, $c_i$) computes a child extended private key from the parent extended private key by executing the following steps. First, check whether $i \geq 2^{31}$ (whether the child is a hardened key). If so (hardened child): let I=HMAC-SHA512 (Key=$c_{PAR}$, Data=0x00∥$ser_{256}$ ($k_{PAR}$)∥$ser_{32}$ (i)). (Note: The 0x00 pads the private key to make it 33 bytes long.) The HMAC-SHA512 function is specified in RFC 4231. If the child is not a hardened key, (normal child): let I=HMAC-SHA512 (Key=$c_{PAR}$, Data=$ser_P$(point($k_{PAR}$))∥ $ser_{32}$(i)). Split I into two 32-byte sequences, $I_L$ and $I_R$. The returned child key $k_i$ is $parse_{256}$ ($I_L$)+$k_{PAR}$ (mod n). The returned chain code $c_i$ is $I_R$. In case $parse_{256}$ ($I_L$)≥n or $k_i$=0, the resulting key is invalid, and one should proceed with the next value for i. (Note: this has probability lower than 1 in $2^{127}$.)

Next, the public FLOW key can be generated from the public (parent) ETH key as follows. The function CKDpub (($K_{PAR}$, $c_{PAR}$), i)→($K_i$, $c_i$) computes a child extended public key from the parent extended public key. It is only defined for non-hardened child keys. Check whether $i \geq 2^{31}$ (whether the child is a hardened key). If so (hardened child): return failure. If not (normal child): let I=IMAC-SHA512 (Key=$c_{PAR}$, Data=$ser_P$($K_{PAR}$)∥ $ser_{32}$(i)). Split I into two 32-byte sequences, $I_L$ and $I_R$. The returned child key $K_i$ is point($parse_{256}$($I_L$))+$K_{PAR}$. The returned chain code $c_i$ is $I_R$. In case $parse_{256}$($I_L$)≥n or $K_i$ is the point at infinity, the resulting key is invalid, and one should proceed with the next value for i.

Instead, the private ETH (parent) key may be used to generate the public FLOW (child) key as follows. The function N((k, c))→(K, c) computes the extended public key corresponding to an extended private key (the "neutered" version, as it removes the ability to sign transactions). The returned key K is point(k). The returned chain code c is just the passed chain code. To compute the public child key of a parent private key: N(CKDpriv (($k_{PAR}$, $c_{PAR}$), i)) (works always). CKDpub(N($k_{PAR}$, $c_{PAR}$), i) (works only for non-hardened child keys).

The generated FLOW key pair is then used for the user's FLOW wallet (i.e., the generated key pair are used as transaction credentials $203_{TARGE}$ for the user 201 on FLOW, the target blockchain $211_{TARGET}$) Although the above example describes creating FLOW transactions credentials for the user 201, it is to be understood that the target blockchain $211_{TARGET}$ need not be FLOW, and in other implementations target transaction credentials $203_{TARGET}$ are created for the user 201 for other blockchains. Once the endpoint app 109 has created the target transaction credentials $203_{TARGET}$ for the user 201, the endpoint app 109 can transmit a control signal to the backend component 111 indicating that the endpoint app 109 has done so. The endpoint app 109 can transmit the user's address for the target blockchain to the backend component 111, either as part of the control signal or separately.

Several example processes are now described for purchasing an NFT, the price of which is denominated in one given cryptocurrency, yet the user 201 (i.e., the purchaser of the NFT) only has, or would otherwise prefer to purchase, with a different cryptocurrency. The description of the examples continues to refer to a scenario in which the user has an Ethereum wallet and possesses ETH (Ethereum tokens), whereas the NFT in question is described as being on the FLOW blockchain with an asking price in FLOW tokens. It is to be understood that other blockchains and associated currencies are equally applicable. For example, it is equally possible to use this same process to purchase an NFT on the Ethereum blockchain with Bitcoin. It is to be further understood that although these examples describe the asset being purchased as an NFT, the same process can be applied in other implementations to purchase any other class of blockchain based asset (e.g., any asset that can be held or represented on a blockchain, including other forms of smart contracts).

The cross-blockchain transaction processing system 101 manages an underlying currency swap to exchange the user's source cryptocurrency (ETH in this example) into cryptocurrency for the target blockchain $211_{TARGET}$ (FLOW tokens in this example). The swap may be processed by a cryptocurrency exchange 209 and is transparent (i.e., invisible) to the user 201. More specifically, the cross-blockchain transaction processing system 101 (typically although not necessarily the backend component 111) can retrieve the current exchange rate and fees to convert ETH to FLOW from an appropriate cryptocurrency exchange 209. A cryptocurrency exchange 209 provides a high-level way to exchange one cryptocurrency for another in a transparent way, typically charging a fee on top of each transaction. In one implementation, the cross-blockchain transaction processing system 101 uses an external third-party exchange 209 such as Uniswap (for Ethereum-based tokens) or Kraken (for tokens for other chains) to exchange cryptocurrencies. In other implementations, the cross-blockchain transaction processing system 101 itself acts as a cryptocurrency exchange 209 in this context. It is to be understood that although the cryptocurrency exchange 209 is illustrated as a separate entity in FIG. 2, in implementations in which the functionality of the cryptocurrency exchange 209 is provided by the cross-blockchain transaction processing system 101, the cryptocurrency exchange 209 can be instantiated as part of the backend component 111.

In either case, when the user 201 indicates, e.g., via the cross-blockchain transaction processing system 101 GUI, that s/he wishes to purchase the NFT (or other type of blockchain based asset), the cross-blockchain transaction processing system 101 determines the amount of ETH required to be converted into FLOW tokens to purchase the NFT at the current exchange rate. The cross-blockchain transaction processing system 101 transfers the appropriate amount of ETH from the user's ETH wallet to itself, and that transaction is recorded on the Ethereum blockchain. The cross-blockchain transaction processing system 101 can then use its own pool of FLOW for the exchange of the ETH to FLOW, or exchange the ETH to FLOW using an external exchange 209. The cross-blockchain transaction processing system 101 may either exchange ETH to FLOW in live time, or keep sufficient amounts of each currency on hand, and perform exchanges at a different time, for example to maximize its position based on fluctuating exchange rates or other factors.

The cross-blockchain transaction processing system 101 then transmits the requisite amount of FLOW to the marketplace offering the NFT. The cross-blockchain transaction processing system 101 purchases the NFT, which is transferred to the cross-blockchain transaction processing system 101 by the marketplace, or by the NFT owner on whose behalf the marketplace is offering it. The cross-blockchain transaction processing system 101 then transfers the NFT into the user's FLOW wallet. Optionally, if the exchange rate was more favorable at the time of execution, any leftover funds can be returned to the user's wallet in ETH, the original currency. Note that the exchange of cryptocurrency, is done by the cross-blockchain transaction processing system 101 transparently to the user 201. Further, because the transactions with the NFT market are with the cross-blockchain transaction processing system 101, only the address(es) of the cross-blockchain transaction processing system 101 are exposed to the market, not the user's wallet address(es). In this example, there is only one outgoing transaction from the user's wallet: the transfer of the source cryptocurrency to be exchanged. The actual purchase of the NFT is processed by the cross-blockchain transaction processing system 101.

A second example process is now described, in which there are two outgoing transactions from the user's wallet: one to convert the currency which s/he currently owns to the target cryptocurrency needed to purchase the NFT, and one to purchase the NFT using that newly acquired cryptocurrency. Transactions are pre-signed once the user 201 authenticates, via, e.g., the cross-blockchain transaction processing system 101 GUI. Thus, the process of executing multiple transactions is transparent to the user 201; the user 201 is only aware of transferring the ETH out of his/her Ethereum wallet and receiving the FLOW NFT into his/her FLOW wallet.

The cross-blockchain transaction processing system 101 retrieves the current exchange rate and fees for converting ETH to FLOW. The cross-blockchain transaction processing system 101 then calculates what the resulting price of the NFT would be in ETH, factoring in exchange rates (as well as the exchange's fees) and current gas fees (blockchain-based transaction fees) in the respective currencies. Once the conversion rate has been determined, the endpoint app 109 of the cross-blockchain transaction processing system 101 uses the private keys for the user's respective ETH and FLOW wallets to pre-sign both transactions as described below.

Before proceeding with the detailed walkthrough of the example, the use of signatures in blockchains transactions and other additional features utilized by the cross-blockchain transaction processing system 101 in this context in some implementations are now described in more detail. At the most fundamental level, a blockchain transaction is a cryptographically signed set of instructions from an account. When a user creates and signs a transaction, s/he sends it to a node in the blockchain's network (e.g., the Ethereum network or the Flow network). The node will broadcast a request for a transaction to be executed, and, in a proof of work implementation, a miner on the network (e.g., an Ethereum miner) will execute the transaction and share the results with the rest of the blockchain's network. In other implementations, other consensus protocols are used such as proof of stake as described above.

There is typically a gas fee for each transaction. The gas fee is the price that a miner charges to execute a transaction. Gas fees may vary widely based on the current volume of transactions, the number of available miners, and the amount of data in the transaction. Gas fees are usually relatively small compared to the transaction size.

Most blockchains support transactions through RPC (Remote Procedure Call) to a node on the blockchain's network. A user who wishes to make a transaction on the network structures the transaction data into the format specified by the blockchain's standard, and submits it as an RPC to a node on the network.

Digital signatures, also known as cryptographic signatures, are method of providing message integrity and message authentication for a given message using the properties of public-key cryptography. Once a digital signature is created for a message, the signature can be used to verify the message's integrity and sender.

A digital signature provides message integrity. Let us assume that a message is created by the user 201, and is signed using the user's private key. If some third party, Trudy, attempts to intercept and change the contents of the message, when the recipient the seller 207 attempts to verify the signature, the verification process will indicate that the message has been altered and that the seller 207 should discard the message.

A digital signature provides message authentication. Digital signatures are created using the sender's private key, and can be verified with the sender's public key. Successfully verifying a digital signature proves that the sender of the message is the holder of the corresponding private key. In other words, if the user 201 signs a message with his/her private key, and the seller 207 verifies the signature with the user's public key, the seller 207 can be confident that the user 201 was the sender of the message, assuming that his/her key was not stolen (private keys should therefore be kept secure).

A digital signature is created for some message M using a hash function H, and the sender's public key $K_{priv}$. To create the digital signature, the sender calculates H(M), and then encrypts H(M) with $K_{priv}$. This encrypted piece of data is the digital signature.

To verify the user's digital signature, the seller 207 (the message recipient) can decrypt the signature with the user's public key $K_{pub}$, which will produce H(M). The recipient can them compute the hash of the message that they received, H(M'). If H(M), the hash decrypted from the message signature, matches H(M'), the hash that the seller 207 calculated from the message that he received, then the seller 207 can be confident both that the user 201 was the sender of the message (authentication), and that the contents of the message were unchanged by any third party (integrity). If on the other hand H(M) does not match H(M'), the seller 207 can infer that either the user 201 was not the sender of M, or that the message was altered by a third party and should be discarded.

Ethereum uses the SECP256k1 elliptic curve for its public/private key cryptography, and digital signatures are generated using ECDSA, the Elliptic Curve Digital Signature Algorithm. Ethereum also uses the Keccak256 hash function. A variety of signature functions and hash functions may be used in other implementations.

Transferring funds is a common type of transaction on blockchains, although it is not the only type. Most blockchains transactions are similar to Ethereum transactions, each of which includes the following data: the Ethereum address of the recipient; the amount of ETH to transfer; the maximum gas fee that the sender is willing to pay for the transaction; and a digital signature of the contract, which identifies the sender and protects the data from modification.

Someone who wishes to send a transaction builds the transaction which contains all of this data, and then generates and adds the digital signature before sending it to a node on the blockchain's network. Once the transaction is executed, the funds will be transferred from the sender to the recipient.

Each blockchain, whether it is Solana, Ethereum, Bitcoin, FLOW, or some other chain has what is called a block speed. The block speed is the rate at which the blockchain produces new blocks, which together form the public, distributed, immutable ledger of the blockchain. This ledger contains the updated balances of all the accounts on the blockchain's network since the last block. Once a transaction is executed, the transaction's results (i.e., account balances) are reflected in the next block that is added to the chain. At this point, the transaction is completed.

Returning to the example of FIG. 2, as discussed in more detail above, blockchain transactions are signed with the private key of the party initiating the transaction. The wallet stores the private key that is used for signing in an encrypted format for security reasons. To sign and complete a transaction, the user 201 authenticates to the cross-blockchain transaction processing system 101 to decrypt the private key so that the transaction can be signed. However, in this implementation the two transactions that originate from the user's wallet must be done in sequence. Because there is an inherent transaction latency in most blockchain transactions as described above, conventionally the user 201 would have to authenticate to the wallet to sign and send the first transaction, wait for it to complete (this could take 10 minutes, or it could take over a day depending on blockchain transaction volume), and then authenticate again to sign and send the second transaction. To preserve transparency to the user, instead of having the user 201 authenticate for the first transaction, wait until it is completed, and authenticate again for the second transaction, the endpoint app 109 of cross-blockchain transaction processing system 101 generates and pre-signs both transactions after the user 201 authenticates once.

The first transaction which is pre-signed is exchanging ETH for FLOW via the exchange with the fees and rates determined as described above. The second transaction which is pre-signed is exchanging the newly acquired FLOW cryptocurrency for the NFT which the user 201 is purchasing. Once the endpoint app 109 has pre-signed these transactions with the user's target blockchain private key, the endpoint app can transmit a control signal to the backend component 111 indicating that it has done so. The pre-signed transactions can be transmitted to the backend component 111, e.g., as part of the control signal or separately.

The cross-blockchain transaction processing system 101 (typically though not necessarily the backend component 111) executes the first signed transaction that exchanges ETH (including the cost of the NFT purchase, the exchange's transaction fees, and the blockchain's transaction fees) for FLOW, and waits for this transaction to complete. Depending on the blockchain in question (i.e., which cryptocurrencies are in use), the transaction may take less than a minute, or it may take over a day if the blockchain has a high transaction volume.

Once the first pre-signed transaction has successfully executed, the cross-blockchain transaction processing system 101 (again typically though not necessarily the backend component 111) executes the second pre-signed transaction, which is the actual purchase of the NFT. Once the second transaction executes and the FLOW funds are transferred to the marketplace, the marketplace transfers the FLOW NFT to the user's FLOW wallet.

In some implementations, multiple copies of each transaction with a successive series of nonces are pre-signed. A nonce (number once) is a number that can be used just once in a transaction. The series of nonces can be in the form of successive incrementing numbers, each of which functions as a unique transaction identifier. The nonces used in this context to identify the pre-signed transactions may be numbered sequentially, e.g., the first transaction can have a nonce of 0, the second can have a nonce of 1, and so forth. Each nonce is unique; a transaction will fail if a transaction with a duplicate nonce has already been processed. Transactions generally are sent with incrementing sequential nonces. A transaction from a given user with a nonce of 50 will not be processed until a transaction from the same user with a nonce of 49 has been processed.

Because the pre-signed transactions are sent by the backend component 111 asynchronously to any other transactions the user may wish to send independently, multiple copies of the transactions with different nonces can be pre-signed and provided to the backend component 111. Suppose that pre-signed transactions with nonces of 48 and 49 are provided for the currency swap, and the backend successfully sends transaction 48, but before transaction 49 can be sent by the backend and processed, the user sends a separate unrelated transaction from his/her device. The user's device will check the blockchain and see that the last processed transaction had a nonce of 48, and will thus send the user's transaction with a nonce of 49, the same nonce as the second pre-signed transaction. Only one of the two transactions with a nonce of 49 will be processed; the other will fail. In the event that the transaction from the user's devices is processed first, the second pre-signed transaction sent by the backend component 111 will fail, and a new transaction will need to be pre-signed, transmitted to the backend, and sent and processed.

To prevent requiring a new transaction pre-signature in such an event, multiple copies of each pre-signed transaction can be provided to the backend component 111 with successive nonces. For example, where the user's last processed transaction nonce is 47, copies of the first transaction with nonces 48 through 58 could be pre-signed, and copies of the second transaction with nonces 49 through 59 could be pre-signed. Before the backend sends each of the pre-signed transactions, it checks to see the nonce of the last processed transaction from the user. It then uses a copy of the pre-signed transaction with the next nonce.

For example, suppose the user sends a transaction with a nonce of 48 before the backend sends the first pre-signed transaction. Then, the backend sends the copy of the first transaction with the nonce of 49. Once that clears, the backend again checks to see the nonce of the user's last signed transaction. It is expected to be 49 in this example, but if the user has sent another transaction during the interval, then it would be 50. In the first case, the backend component sends the copy of the pre-signed second transaction with the nonce of 50. In the second case, where the user has sent another transaction, the backend component 111 uses copy of the pre-signed second transaction with nonce of 51. It is to be understood that the number of copies of each transaction to provide to the backend with sequential nonces is a variable design parameter (e.g., 5, 10, 25, etc.).

Essentially, the issue here is that the user is an agent independent of the backend, and can send additional transactions which are asynchronous to the execution of pre-signed transactions by the backend. Providing multiple copies of the transactions with successive nonces to the backend prevents having to re-prompt the user for an additional signature if s/he has executed a transaction before the swap finishes, and prevents the need to wait for the swap to finish before allowing the user to conduct any additional transactions.

Figure 3:
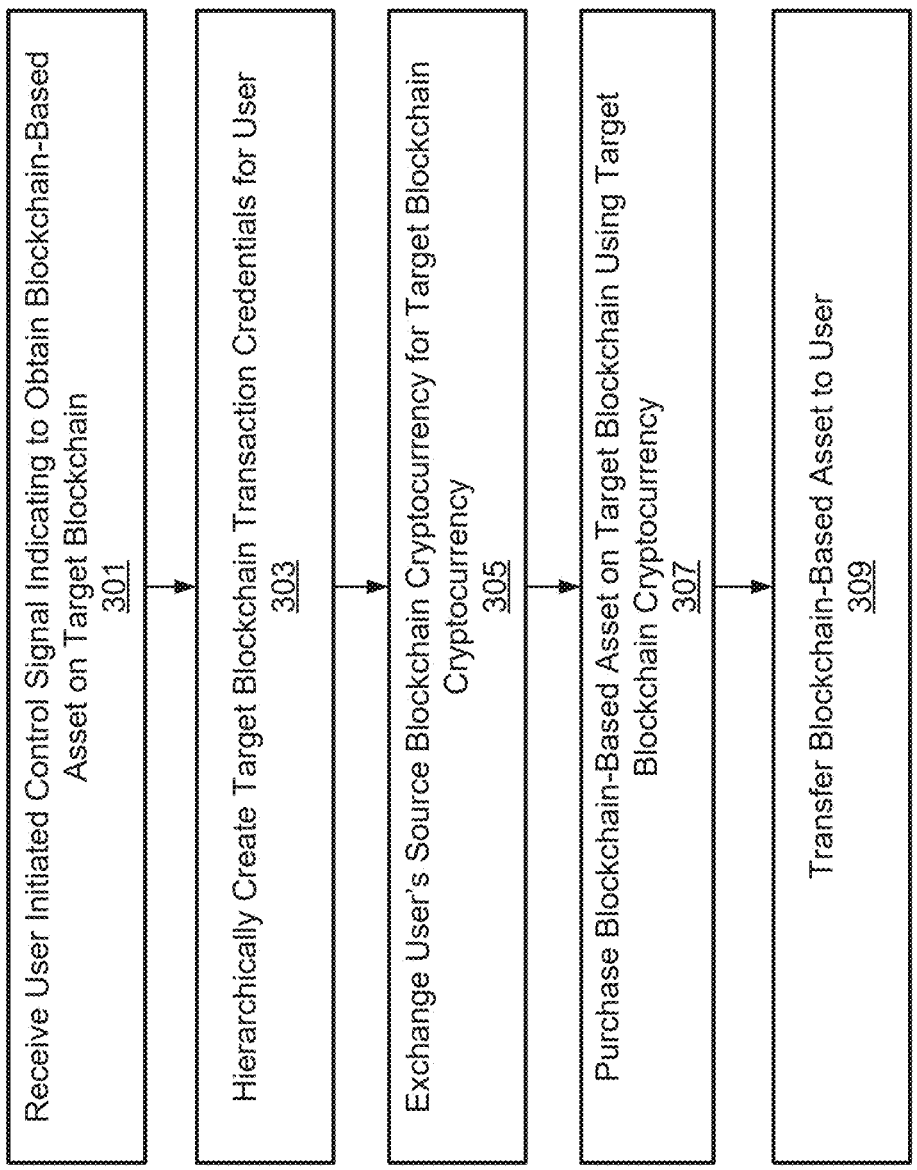
FIG. 3 illustrates steps of the operation of a cross-blockchain transaction processing system, according to some implementations.

FIG. 3 is a flowchart illustrating steps for purchasing a blockchain-based asset using the first example process described above, according to some implementations. As illustrated in FIG. 3, the cross-blockchain transaction processing system 101 receives 301 a user-initiated control signal indicating to obtain a blockchain-based asset on the target blockchain, in a scenario in which the user has source blockchain transaction credentials but does not have target blockchain transaction credentials. Next, the endpoint app 109 of the cross-blockchain transaction processing system 101 hierarchically creates 303 target blockchain transaction credentials for the user, using the initial seed of entropy that was used to create the user's source blockchain transaction credentials. The creation of the target blockchain transaction credentials is transparent to the user. The cross-blockchain transaction processing system 101 (e.g., the backend component 111) then exchanges 305 an amount of the user's source blockchain cryptocurrency for an amount of target blockchain cryptocurrency at least sufficient to obtain the blockchain-based asset on the target blockchain. Once again, this is done transparently to the user. In some implementations, the cross-blockchain transaction processing system 101 uses a pool of target blockchain cryptocurrency stored by the backend component 109 to facilitate the exchange. In other implementations, the exchange is facilitated by using an external cryptocurrency exchange service. Either way, in the implementation illustrated in FIG. 3 the backend component 109 of the cross-blockchain transaction processing system 101 uses the obtained target blockchain cryptocurrency to purchase 307 the blockchain-based asset on the target blockchain, using its own target blockchain transaction credentials (i.e., those of the backend component 109 as opposed to those of the user). The backend component 109 then transfers 309 the blockchain-based asset from itself to the user, such that the user's target blockchain transaction credentials are not exposed during the purchase of the blockchain-based asset.

Figure 4:
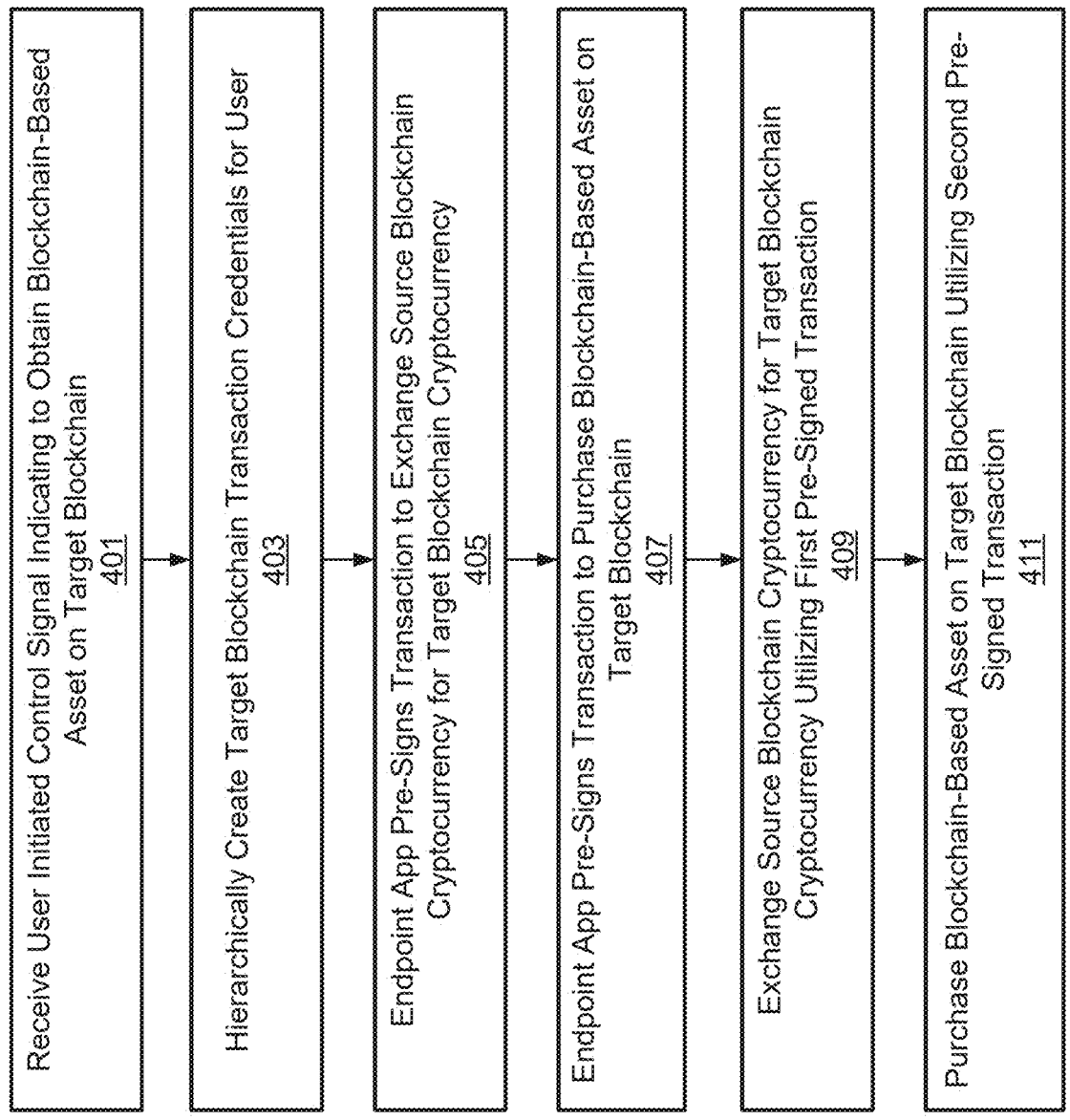
FIG. 4 illustrates steps of the operation of a cross-blockchain transaction processing system, according to other implementations.

FIG. 4 is a flowchart illustrating steps for purchasing a blockchain-based asset using the second example process described above, according to some implementations. As illustrated in FIG. 4, the cross-blockchain transaction processing system 101 receives 401 a user-initiated control signal indicating to obtain a blockchain-based asset on the target blockchain, in a scenario in which the user has source blockchain transaction credentials but does not have target blockchain transaction credentials. Next, the endpoint app 109 of the cross-blockchain transaction processing system 101 hierarchically creates 403 target blockchain transaction credentials for the user, using the initial seed of entropy that was used to create the user's source blockchain transaction credentials. The creation of the target blockchain transaction credentials is transparent to the user. The endpoint app 109 pre-signs 405 a first transaction with the user's source blockchain private key transparently to the user. The first transaction is a transaction to exchange source blockchain cryptocurrency of the user for an amount of target blockchain cryptocurrency at least sufficient to obtain the blockchain-based asset on the target blockchain. The endpoint app 109 also pre-signs 407 a second transaction with the user's target blockchain private key transparently to the user. The second transaction is a transaction to use target blockchain cryptocurrency to purchase the blockchain-based asset on the target blockchain. Transparently to the user, the cross-blockchain transaction processing system 101 utilizes the pre-signed first transaction to automatically exchange 409 source blockchain cryptocurrency of the user for the amount of the target blockchain cryptocurrency at least sufficient to obtain the blockchain-based asset. Also transparently to the user, the cross-blockchain transaction processing system 101 utilizes the pre-signed second transaction to use target blockchain cryptocurrency to purchase 411 the blockchain-based asset on the target blockchain FIG. 5 is a block diagram of an example computer system 610 suitable for implementing a cross-blockchain transaction processing system 101. Both endpoint computer systems 103 and backend computer systems 105 can be implemented in the form of such computer systems 610. As illustrated, one component of the computer system 610 is a bus 612. The bus 612 communicatively couples other components of the computer system 610, such as at least one processor 614, system memory 617 (e.g., random access memory (RAM), read-only memory (ROM), flash memory), an input/output (I/O) controller 618, an audio output interface 622 communicatively coupled to an audio output device such as a speaker 620, a display adapter 626 communicatively coupled to a video output device such as a display screen 624, one or more interfaces such as Universal Serial Bus (USB) receptacles 628, serial ports 630, parallel ports (not illustrated), etc., a keyboard controller 633 communicatively coupled to a keyboard 632, a storage interface 634 communicatively coupled to one or more hard disk(s) 644 (or other form(s) of storage media), a host bus adapter (HBA) interface card 635A configured to connect with a Fibre Channel (FC) network 690, an HBA interface card 635B configured to connect to a SCSI bus 639, an optical disk drive 640 configured to receive an optical disk 642, a mouse 646 (or other pointing device) coupled to the bus 612, e.g., via a USB receptacle 628, a modem 647 coupled to bus 612, e.g., via a serial port 630, and one or more wired and/or wireless network interface(s) 648 coupled, e.g., directly to bus 612.

Other components (not illustrated) may be connected in a similar manner (e.g., document scanners, digital cameras, printers, etc.). Conversely, all of the components illustrated in FIG. 5 need not be present (e.g., smartphones and tablets typically do not have optical disk drives 640, external keyboards 632 or external pointing devices 646, although various external components can be coupled to mobile computing devices via, e.g., USB receptacles 628). The various components can be interconnected in different ways from that shown in FIG. 5.

The bus 612 allows data communication between the processor 614 and system memory 617, which, as noted above may include ROM and/or flash memory as well as RAM. The RAM is typically the main memory into which the operating system 650 and application programs are loaded. The ROM and/or flash memory can contain, among other code, the Basic Input-Output system (BIOS) which controls certain basic hardware operations. Application programs can be stored on a local computer readable medium (e.g., hard disk 644, optical disk 642) and loaded into system memory 617 and executed by the processor 614. Application programs can also be loaded into system memory 617 from a remote location (i.e., a remotely located computer system 610), for example via the network interface 648 or modem 647. In FIG. 5, the cross-blockchain transaction processing system 101 is illustrated as residing in system memory 617.

The storage interface 634 is coupled to one or more hard disks 644 (and/or other standard storage media). The hard disk(s) 644 may be a part of computer system 610 or may be physically separate and accessed through other interface systems.

The network interface 648 and/or modem 647 can be directly or indirectly communicatively coupled to a network 107 such as the internet. Such coupling can be wired or wireless.

As will be understood by those familiar with the art, the subject matter described herein may be embodied in other specific forms without departing from the spirit or integral characteristics thereof. Likewise, the particular naming and division of the portions, modules, agents, managers, components, functions, procedures, actions, layers, features, attributes, methodologies, data structures and other aspects are not mandatory or significant, and the entities used that implement the subject matter described herein may have different names, divisions and/or formats. The foregoing description, for purpose of explanation, has been described with reference to specific implementations. However, the illustrative discussions above are not intended to be exhaustive or limiting to the precise forms disclosed. Many modifications and variations are possible in view of the above teachings. The implementations were chosen and described in order to best explain relevant principles and their practical applications, to thereby enable others skilled in the art to best utilize various implementations with or without various modifications as may be suited to the particular use contemplated.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic device, that manipulates and transforms data represented as physical (electronic) quantities within the computer system's registers and memories into other data similarly represented as physical quantities within the computer system memories or registers or other such information storage, transmission or display devices.

Finally, the structure, algorithms, and/or interfaces presented herein are not inherently tied to any particular computer or other apparatus. Various general-purpose systems may be used with programs in accordance with the teachings herein, or it may prove convenient to construct more specialized apparatus to perform the method blocks. The structure for a variety of these systems will appear from the description above. In addition, the specification is not described with reference to any particular programming language. It will be appreciated that a variety of programming languages may be used to implement the teachings of the specification as described herein.

Accordingly, the disclosure is intended to be illustrative, but not limiting.

What is claimed is:

1. A computer implemented method for automatically executing transactions across a source blockchain and a separate target blockchain, the method comprising:
    receiving, by a backend computer system from an endpoint computer system operated by a user, a control signal indicating to obtain a blockchain-based asset on the target blockchain;
    wherein the user has source blockchain transaction credentials, the user's source blockchain transaction credentials having been created using an initial seed of entropy, and the user's source blockchain transaction credentials not being compatible with the target blockchain;
    wherein the user does not have target blockchain transaction credentials;
    wherein the source blockchain uses a source blockchain cryptocurrency and the target blockchain uses a target blockchain cryptocurrency, the source blockchain cryptocurrency not being compatible with the target blockchain, and the target blockchain cryptocurrency not being compatible with the source blockchain;
    wherein transaction credentials for a specific blockchain further comprise at least a unique public/private key pair and an address configured for transacting on the specific blockchain;
    receiving, by the backend computer system from the endpoint computer system, a control signal indicating that the endpoint computer system has automatically hierarchically created target blockchain transaction credentials for the user, using the initial seed of entropy that was used to create the user's source blockchain transaction credentials, transparently to the user, without requiring the user to create the target blockchain credentials, and without requiring any input from the user to create the target blockchain credentials;
    automatically obtaining an amount of target blockchain cryptocurrency at least sufficient to obtain the blockchain-based asset on the target blockchain, by the backend computer system, in exchange for source blockchain cryptocurrency of the user; and
    using the obtained target blockchain cryptocurrency and the hierarchically created target blockchain transaction credentials to automatically obtain the blockchain-based asset on the target blockchain;
    wherein the obtained blockchain-based asset is registered to the address of the user's hierarchically created target blockchain transaction credentials.

2. The method of claim 1 wherein automatically hierarchically creating target blockchain transaction credentials for the user, using the initial seed of entropy that was used to create the user's source blockchain transaction credentials, transparently to the user, without requiring the user to create the target blockchain credentials, and without requiring any input from the user to create the target blockchain credentials further comprises:
    transparently to the user, using a private child key derivation function to derive a private key for the user to transact on the target blockchain, from the private key of the user's source blockchain transaction credentials; and
    transparently to the user, using a public child key derivation function to derive a public key for the user to transact on the target blockchain, from the public key of the user's source blockchain transaction credentials.

3. The method of claim 1 wherein automatically hierarchically creating target blockchain transaction credentials for the user, using the initial seed of entropy that was used to create the user's source blockchain transaction credentials, transparently to the user, without requiring the user to create the target blockchain credentials, and without requiring any input from the user to create the target blockchain credentials further comprises:
    transparently to the user, using a private child key derivation function to derive a private key for the user to transact on the target blockchain, from the private key of the user's source blockchain transaction credentials; and
    transparently to the user, using a public child key derivation function to derive a public key for the user to transact on the target blockchain, from the private key of the user's source blockchain transaction credentials.

4. The method of claim 1 wherein automatically obtaining an amount of target blockchain cryptocurrency at least sufficient to obtain the blockchain-based asset on the target blockchain in exchange for source blockchain cryptocurrency of the user further comprises:
    transparently to the user, exchanging, by the backend computer system, an amount of the user's source blockchain cryptocurrency for the amount of target blockchain cryptocurrency at least sufficient to obtain the blockchain-based asset on the target blockchain.

5. The method of claim 4 wherein exchanging the determined amount of the user's source blockchain cryptocurrency for target blockchain cryptocurrency further comprises:
    using a pool of target blockchain cryptocurrency stored by the backend computer system to facilitate the exchange.

6. The method of claim 4 wherein exchanging the determined amount of the user's source blockchain cryptocurrency for target blockchain cryptocurrency further comprises:
    using an external cryptocurrency exchange service to facilitate the exchange.

7. The method of claim 1 wherein using the obtained target blockchain cryptocurrency and the hierarchically created target blockchain transaction credentials to automatically obtain the blockchain-based asset on the target blockchain further comprises:
    using the obtained target blockchain cryptocurrency to purchase, by the backend computer system, the blockchain-based asset on the target blockchain, using target blockchain transaction credentials of the backend computer system; and
    transferring the blockchain-based asset from the backend computer system to the user, such that the user's target blockchain transaction credentials are not exposed during the purchase of the blockchain-based asset.

8. The method of claim 1 further comprising:
    receiving, by the backend computer system from the endpoint computer system, a control signal indicating that the endpoint computer system has pre-signed a first transaction with the user's source blockchain private key transparently to the user, and pre-signed a second transaction with the user's target blockchain private key transparently to the user;

wherein the first transaction comprises a transaction to exchange source blockchain cryptocurrency of the user for the amount of the target blockchain cryptocurrency at least sufficient to obtain the blockchain-based asset on the target blockchain;

wherein the second transaction comprises a transaction to use target blockchain cryptocurrency to purchase the blockchain-based asset on the target blockchain;

transparently to the user, utilizing the pre-signed first transaction to automatically exchange the source blockchain cryptocurrency of the user for the amount of the target blockchain cryptocurrency at least sufficient to obtain the blockchain-based asset; and transparently to the user, utilizing the pre-signed second transaction to use target blockchain cryptocurrency to purchase the blockchain-based asset on the target blockchain.

9. The method of claim 8 wherein the control signal received by the backend computer system from the endpoint computer system further indicates:

that the endpoint computer system has, prior to pre-signing the first transaction, determined a nonce of a last transaction processed for the user, and pre-signed multiple copies of the first transaction having successive incrementing nonces, transparently to the user; and that the endpoint computer system has, prior to pre-signing the second transaction, determined a nonce of a last transaction processed for the user, and pre-signed multiple copies of the second transaction having successive incrementing nonces, transparently to the user; the method further comprising:

receiving, by the backend computer system from the endpoint computer system, the multiple pre-signed copies of the first transaction and the multiple pre-signed copies of the second transaction;

prior to utilizing the pre-signed first transaction, determining a nonce of a last transaction processed for the user;

utilizing a copy of the pre-signed first transaction with a successive incremented nonce;

prior to utilizing the pre-signed second transaction, determining a nonce of a last transaction processed for the user; and utilizing a copy of the pre-signed second transaction with a successive incremented nonce.

10. The method of claim 1 wherein:
the transaction credentials for the source blockchain further comprise a cryptocurrency wallet configured for the source blockchain; and
the transaction credentials for the target blockchain further comprise a cryptocurrency wallet configured for the target blockchain.

11. The method of claim 1 wherein:
the obtained blockchain-based asset further comprises a non-fungible token (NFT) on the target blockchain.

12. The method of claim 10 wherein automatically obtaining the blockchain-based asset on the target blockchain further comprises:
executing a smart contract on the target blockchain to obtain the NFT.

13. The method of claim 1 wherein:
the source blockchain and the target blockchain each comprise separate ones from a group consisting of: FLOW, Ethereum, Solana, and Bitcoin.

14. A computer implemented method for automatically executing transactions across a source blockchain and a separate target blockchain, the method comprising:

in response to a user of the endpoint computer system selecting a specific blockchain-based asset on the target blockchain via an interface, automatically hierarchically creating, by the endpoint computer system, target blockchain transaction credentials for the user, using the initial seed of entropy that was used to create the user's source blockchain transaction credentials, transparently to the users, without requiring the user to create the target blockchain credentials, and without requiring any input from the user to create the target blockchain credentials; and automatically obtaining the blockchain-based asset on the target blockchain, using the hierarchically created target blockchain transaction credentials, and using target blockchain cryptocurrency obtained by the backend computer system in exchange for source blockchain cryptocurrency of the user;

wherein the user has source blockchain transaction credentials, the user's source blockchain transaction credentials having been created using an initial seed of entropy, and the user's source blockchain transaction credentials not being compatible with the target blockchain;

wherein the user does not have target blockchain transaction credentials;

wherein the source blockchain uses a source blockchain cryptocurrency and the target blockchain uses a target blockchain cryptocurrency, the source blockchain cryptocurrency not being compatible with the target blockchain, and the target blockchain cryptocurrency not being compatible with the source blockchain;

wherein transaction credentials for a specific blockchain further comprise at least a unique public/private key pair and an address configured for transacting on the specific blockchain;

wherein the obtained blockchain-based asset is registered to the address of the user's hierarchically created target blockchain transaction credentials.

15. The method of claim 14 wherein automatically hierarchically creating target blockchain transaction credentials for the user, using the initial seed of entropy that was used to create the user's source blockchain transaction credentials, transparently to the user, without requiring the user to create the target blockchain credentials, and without requiring any input from the user to create the target blockchain credentials further comprises:

transparently to the user, using, by the endpoint computer system, a private child key derivation function to derive a private key for the user to transact on the target blockchain, from the private key of the user's source blockchain transaction credentials; and transparently to the user, using, by the endpoint computer system, a public child key derivation function to derive a public key for the user to transact on the target blockchain, from the public key of the user's source blockchain transaction credentials.

16. The method of claim 14 wherein automatically hierarchically creating target blockchain transaction credentials for the user, using the initial seed of entropy that was used to create the user's source blockchain transaction credentials, transparently to the user, without requiring the user to create the target blockchain credentials, and without requiring any input from the user to create the target blockchain credentials further comprises:

transparently to the user, using, by the endpoint computer system, a private child key derivation function to derive a private key for the user to transact on the target blockchain, from the private key of the user's source blockchain transaction credentials; and transparently to the user, using, by the endpoint computer system, a public child key derivation function to derive a public key for the user to transact on the target blockchain, from the private key of the user's source blockchain transaction credentials.

17. The method of claim 14 where automatically obtaining the blockchain-based asset on the target blockchain further comprises:

pre-signing a first transaction with the user's source blockchain private key transparently to the user, the first transaction comprising a transaction to exchange source blockchain cryptocurrency of the user for the amount of the target blockchain cryptocurrency at least sufficient to obtain the blockchain-based asset on the target blockchain;

pre-signing a second transaction with the user's target blockchain private key transparently to the user, the second transaction comprising a transaction to use target blockchain cryptocurrency to purchase the blockchain-based asset on the target blockchain;

transparently to the user, utilizing the pre-signed first transaction to automatically exchange the source blockchain cryptocurrency of the user for the amount of the target blockchain cryptocurrency at least sufficient to obtain the blockchain-based asset; and transparently to the user, utilizing the pre-signed second transaction to use target blockchain cryptocurrency to purchase the blockchain-based asset on the target blockchain.

18. The method of claim 17 further comprising:

prior to pre-signing the first transaction and second transactions, determining a nonce of a last transaction processed for the user;

pre-signing multiple copies of the first transaction having successive incrementing nonces, transparently to the user;

pre-signing multiple copies of the second transaction having successive incrementing nonces, transparently to the user;

prior to utilizing the pre-signed first transaction, determining a nonce of a last transaction processed for the user;

utilizing a copy of the pre-signed first transaction with a successive incremented nonce;

prior to utilizing the pre-signed second transaction, determining a nonce of a last transaction processed for the user;

utilizing a copy of the pre-signed second transaction with a successive incremented nonce.

19. The method of claim 14 wherein:

the transaction credentials for the source blockchain further comprise a cryptocurrency wallet configured for the source blockchain; and the transaction credentials for the target blockchain further comprise a cryptocurrency wallet configured for the target blockchain.

20. The method of claim 14 wherein:

the obtained blockchain-based asset further comprises a non-fungible token (NFT) on the target blockchain.

21. The method of claim 19 wherein automatically obtaining the blockchain-based asset on the target blockchain further comprises:

executing a smart contract on the target blockchain to obtain the NFT.

22. At least one non-transitory computer-readable storage medium for automatically executing transactions across a source blockchain and a separate target blockchain, the at least one non-transitory computer-readable storage medium storing computer executable instructions that, when loaded into computer memory and executed by at least one processor of a computing device, cause the computing device to perform the following steps:

receiving, by a backend computer system from a user operating an endpoint computer system, a control signal indicating to obtain a blockchain-based asset on the target blockchain;

wherein the user has source blockchain transaction credentials, the user's source blockchain transaction credentials having been created using an initial seed of entropy, and the user's source blockchain transaction credentials not being compatible with the target blockchain;

wherein the user does not have target blockchain transaction credentials;

wherein the source blockchain uses a source blockchain cryptocurrency and the target blockchain uses a target blockchain cryptocurrency, the source blockchain cryptocurrency not being compatible with the target blockchain, and the target blockchain cryptocurrency not being compatible with the source blockchain;

wherein transaction credentials for a specific blockchain further comprise at least a unique public/private key pair and an address configured for transacting on the specific blockchain;

receiving, by the backend computer system from the endpoint computer system, a control signal indicating that the endpoint computer system has automatically hierarchically created target blockchain transaction credentials for the user, using the initial seed of entropy that was used to create the user's source blockchain transaction credentials, transparently to the user, without requiring the user to create the target blockchain credentials, and without requiring any input from the user to create the target blockchain credentials;

automatically obtaining an amount of target blockchain cryptocurrency at least sufficient to obtain the blockchain-based asset on the target blockchain, by the backend computer system, in exchange for source blockchain cryptocurrency of the user; and using the obtained target blockchain cryptocurrency and the hierarchically created target blockchain transaction credentials to automatically obtain the blockchain-based asset on the target blockchain;

wherein the obtained blockchain-based asset is registered to the address of the user's hierarchically created target blockchain transaction credentials.

23. The at least one non-transitory computer-readable storage medium of claim 22 wherein automatically hierarchically creating target blockchain transaction credentials for the user, using the initial seed of entropy that was used to create the user's source blockchain transaction credentials, transparently to the user, without requiring the user to create the target blockchain credentials, and without requiring any input from the user to create the target blockchain credentials further comprises:

transparently to the user, using a private child key derivation function to derive a private key for the user to transact on the target blockchain, from the private key of the user's source blockchain transaction credentials; and transparently to the user, using a public child key derivation function to derive a public key for the user to transact on the target blockchain, from the public key of the user's source blockchain transaction credentials.

24. The at least one non-transitory computer-readable storage medium of claim 22 wherein automatically hierarchically creating target blockchain transaction credentials for the user, using the initial seed of entropy that was used to create the user's source blockchain transaction credentials, transparently to the user, without requiring the user to create the target blockchain credentials, and without requiring any input from the user to create the target blockchain credentials further comprises:
  transparently to the user, using a private child key derivation function to derive a private key for the user to transact on the target blockchain, from the private key of the user's source blockchain transaction credentials; and
  transparently to the user, using a public child key derivation function to derive a public key for the user to transact on the target blockchain, from the private key of the user's source blockchain transaction credentials.

25. The at least one non-transitory computer-readable storage medium of claim 22 wherein automatically obtaining an amount of target blockchain cryptocurrency at least sufficient to obtain the blockchain-based asset on the target blockchain in exchange for source blockchain cryptocurrency of the user further comprises:
  transparently to the user, exchanging, by the backend computer system, an amount of the user's source blockchain cryptocurrency for the amount of target blockchain cryptocurrency at least sufficient to obtain the blockchain-based asset on the target blockchain.

26. The at least one non-transitory computer-readable storage medium of claim 24 wherein exchanging the determined amount of the user's source blockchain cryptocurrency for target blockchain cryptocurrency further comprises:
  using a pool of target blockchain cryptocurrency stored by the backend computer system to facilitate the exchange.

27. The at least one non-transitory computer-readable storage medium claim 24 wherein exchanging the determined amount of the user's source blockchain cryptocurrency for target blockchain cryptocurrency further comprises:
  using an external cryptocurrency exchange service to facilitate the exchange.

28. The at least one non-transitory computer-readable storage medium of claim 22 wherein using the obtained target blockchain cryptocurrency and the hierarchically created target blockchain transaction credentials to automatically obtain the blockchain-based asset on the target blockchain further comprises:
  using the obtained target blockchain cryptocurrency to purchase, by the backend computer system, the blockchain-based asset on the target blockchain, using target blockchain transaction credentials of the backend computer system; and
  transferring the blockchain-based asset from the backend computer system to the user, such that the user's target blockchain transaction credentials are not exposed during the purchase of the blockchain-based asset.

29. The at least one non-transitory computer-readable storage medium of claim 22 further comprising:
  receiving, by the backend computer system from the endpoint computer system, a control signal indicating that the endpoint computer system has pre-signed a first transaction with the user's source blockchain private key transparently to the user, and pre-signed a second transaction with the user's target blockchain private key transparently to the user;
  wherein the first transaction comprises a transaction to exchange source blockchain cryptocurrency of the user for the amount of the target blockchain cryptocurrency at least sufficient to obtain the blockchain-based asset on the target blockchain;
  wherein the second transaction comprises a transaction to use target blockchain cryptocurrency to purchase the blockchain-based asset on the target blockchain;
  transparently to the user, utilizing the pre-signed first transaction to automatically exchange the source blockchain cryptocurrency of the user for the amount of the target blockchain cryptocurrency at least sufficient to obtain the blockchain-based asset; and
  transparently to the user, utilizing the pre-signed second transaction to use target blockchain cryptocurrency to purchase the blockchain-based asset on the target blockchain.

30. The at least one non-transitory computer-readable storage medium of claim 29 further comprising:
  wherein the control signal received by the backend computer system from the endpoint computer system further indicates:
    that the endpoint computer system has, prior to pre-signing the first transaction, determined a nonce of a last transaction processed for the user, and pre-signed multiple copies of the first transaction having successive incrementing nonces, transparently to the user; and
    that the endpoint computer system has, prior to pre-signing the second transaction, determined a nonce of a last transaction processed for the user, and pre-signed multiple copies of the second transaction having successive incrementing nonces, transparently to the user;
  receiving, by the backend computer system from the endpoint computer system, the multiple pre-signed copies of the first transaction and the multiple pre-signed copies of the second transaction;
  prior to utilizing the pre-signed first transaction, determining a nonce of a last transaction processed for the user;
  utilizing a copy of the pre-signed first transaction with a successive incremented nonce;
  prior to utilizing the pre-signed second transaction, determining a nonce of a last transaction processed for the user; and
  utilizing a copy of the pre-signed second transaction with a successive incremented nonce.

31. At least one non-transitory computer-readable storage medium for automatically executing transactions across a source blockchain and a separate target blockchain, the at least one non-transitory computer-readable storage medium storing computer executable instructions that, when loaded into computer memory and executed by at least one processor of a computing device, cause the computing device to perform the following steps:
  in response to a user of the endpoint computer system selecting a specific blockchain-based asset on the target blockchain via an interface, automatically hierarchically creating, by the endpoint computer system, target blockchain transaction credentials for the user, using the initial seed of entropy that was used to create the user's source blockchain transaction credentials, transparently to the user, without requiring the user to create the target blockchain credentials, and without requiring any input from the user to create the target blockchain credentials; and automatically obtaining the blockchain-based asset on the target blockchain, using the hierarchically created target blockchain transaction credentials, and using target blockchain cryptocurrency obtained by the backend computer system in exchange for source blockchain cryptocurrency of the user;

wherein the user has source blockchain transaction credentials, the user's source blockchain transaction credentials having been created using an initial seed of entropy, and the user's source blockchain transaction credentials not being compatible with the target blockchain;

wherein the user does not have target blockchain transaction credentials;

wherein the source blockchain uses a source blockchain cryptocurrency and the target blockchain uses a target blockchain cryptocurrency, the source blockchain cryptocurrency not being compatible with the target blockchain, and the target blockchain cryptocurrency not being compatible with the source blockchain;

wherein transaction credentials for a specific blockchain further comprise at least a unique public/private key pair and an address configured for transacting on the specific blockchain;

wherein the obtained blockchain-based asset is registered to the address of the user's hierarchically created target blockchain transaction credentials.

32. The at least one non-transitory computer-readable storage medium of claim 31 wherein automatically hierarchically creating target blockchain transaction credentials for the user, using the initial seed of entropy that was used to create the user's source blockchain transaction credentials, transparently to the user, without requiring the user to create the target blockchain credentials, and without requiring any input from the user to create the target blockchain credentials further comprises:

transparently to the user, using, by the endpoint computer system, a private child key derivation function to derive a private key for the user to transact on the target blockchain, from the private key of the user's source blockchain transaction credentials; and transparently to the user, using, by the endpoint computer system, a public child key derivation function to derive a public key for the user to transact on the target blockchain, from the public key of the user's source blockchain transaction credentials.

33. The at least one non-transitory computer-readable storage medium of claim 31 wherein automatically hierarchically creating target blockchain transaction credentials for the user, using the initial seed of entropy that was used to create the user's source blockchain transaction credentials, transparently to the user, without requiring the user to create the target blockchain credentials, and without requiring any input from the user to create the target blockchain credentials further comprises:

transparently to the user, using, by the endpoint computer system, a private child key derivation function to derive a private key for the user to transact on the target blockchain, from the private key of the user's source blockchain transaction credentials; and transparently to the user, using, by the endpoint computer system, a public child key derivation function to derive a public key for the user to transact on the target blockchain, from the private key of the user's source blockchain transaction credentials.

34. The at least one non-transitory computer-readable storage medium of claim 31 where automatically obtaining the blockchain-based asset on the target blockchain further comprises:

pre-signing a first transaction with the user's source blockchain private key transparently to the user, the first transaction comprising a transaction to exchange source blockchain cryptocurrency of the user for the amount of the target blockchain cryptocurrency at least sufficient to obtain the blockchain-based asset on the target blockchain;

pre-signing a second transaction with the user's target blockchain private key transparently to the user, the second transaction comprising a transaction to use target blockchain cryptocurrency to purchase the blockchain-based asset on the target blockchain;

transparently to the user, utilizing the pre-signed first transaction to automatically exchange the source blockchain cryptocurrency of the user for the amount of the target blockchain cryptocurrency at least sufficient to obtain the blockchain-based asset; and transparently to the user, utilizing the pre-signed second transaction to use target blockchain cryptocurrency to purchase the blockchain-based asset on the target blockchain.

35. The at least one non-transitory computer-readable storage medium of claim 34 further comprising:

prior to pre-signing the first transaction and second transactions, determining a nonce of a last transaction processed for the user;

pre-signing multiple copies of the first transaction having successive incrementing nonces, transparently to the user;

pre-signing multiple copies of the second transaction having successive incrementing nonces, transparently to the user;

prior to utilizing the pre-signed first transaction, determining a nonce of a last transaction processed for the user;

utilizing a copy of the pre-signed first transaction with a successive incremented nonce;

prior to utilizing the pre-signed second transaction, determining a nonce of a last transaction processed for the user;

utilizing a copy of the pre-signed second transaction with a successive incremented nonce.

36. The at least one non-transitory computer-readable storage medium of claim 31 wherein:

the transaction credentials for the source blockchain further comprise a cryptocurrency wallet configured for the source blockchain; and the transaction credentials for the target blockchain further comprise a cryptocurrency wallet configured for the target blockchain.

37. The at least one non-transitory computer-readable storage medium of claim 31 wherein:

the obtained blockchain-based asset further comprises a non-fungible token (NFT) on the target blockchain.

38. The at least one non-transitory computer-readable storage medium of claim 36 wherein automatically obtaining the blockchain-based asset on the target blockchain further comprises:

executing a smart contract on the target blockchain to obtain the NFT.

\* \* \* \* \*